(12) United States Patent
Sjöö

(10) Patent No.: US 8,403,604 B2
(45) Date of Patent: Mar. 26, 2013

(54) ROTATABLE MULTI-OPERATION TOOL FOR CHIP REMOVING MACHINING, AND A BASIC BODY THEREFOR

(75) Inventor: Sture Sjöö, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 13/469,428

(22) Filed: May 11, 2012

(65) Prior Publication Data

US 2012/0315099 A1 Dec. 13, 2012

Related U.S. Application Data

(63) Continuation of application No. 11/987,857, filed on Dec. 5, 2007.

(30) Foreign Application Priority Data

Jan. 17, 2007 (SE) ...................................... 0700112

(51) Int. Cl.
*B23B 51/02* (2006.01)
*B23B 51/08* (2006.01)

(52) U.S. Cl. ............ 408/24; 408/26; 408/224; 408/230; 408/233; 408/713; 407/69; 407/113

(58) Field of Classification Search .................... 408/22, 408/24, 26, 224, 228, 230, 233, 713; 407/47, 407/69, 113; *B23B 51/08*
See application file for complete search history.

(56) References Cited

U.S. PATENT DOCUMENTS

| | | | |
|---|---|---|---|
| 4,265,574 A | 5/1981 | Eckle | |
| 4,293,252 A | 10/1981 | Kress et al. | |
| 4,340,327 A | 7/1982 | Martins | |
| 4,505,626 A | 3/1985 | Benhase | |
| 4,531,867 A | 7/1985 | Benhase | |
| 4,564,321 A | 1/1986 | Kondo et al. | |

(Continued)

FOREIGN PATENT DOCUMENTS

| | | |
|---|---|---|
| DE | 003602427 A1 | 7/1987 |
| DE | 003610016 A1 | 10/1987 |

(Continued)

OTHER PUBLICATIONS

International Search Report dated Apr. 10, 2008—International Application No. PCT/SE2007/051025—Filed on Dec. 18, 2007—Sandvik Intellectual Property AB et al.

(Continued)

*Primary Examiner* — Eric A Gates
(74) *Attorney, Agent, or Firm* — Morgan, Lewis & Bockius LLP

(57) ABSTRACT

Rotatable multi-operation tool including replaceable cutting inserts of different types, and a basic body rotatable around a center axis with rear and front ends from which there is extending rearward an envelope surface in which at least one chip space is countersunk, which opens in the envelope surface and in the front end. A first cutting insert type is mounted in a first insert seat formed in one side surface of the chip space in the immediate vicinity of the front end and included in a cavity opening in the front end for the cutting insert to partly protrude axially forward from the front end. A second cutting insert type is mounted in a second insert seat formed in the same side surface as the first insert seat and situated axially behind the first insert seat and included in a cavity opening in a part of the envelope surface.

18 Claims, 11 Drawing Sheets

U.S. PATENT DOCUMENTS

| | | | |
|---|---|---|---|
| 4,618,296 A | 10/1986 | Allaire et al. |
| 4,699,549 A | 10/1987 | Shimomura et al. |
| 4,898,499 A | 2/1990 | Tsujimura et al. |
| 4,927,303 A | 5/1990 | Tsujimura et al. |
| 4,943,191 A | 7/1990 | Schmitt |
| 5,069,093 A | 12/1991 | Carswell |
| 5,176,477 A | 1/1993 | Noggle |
| 5,622,461 A | 4/1997 | Tukala et al. |
| 5,733,078 A | 3/1998 | Matsushita et al. |
| 5,758,997 A | 6/1998 | Mealey et al. |
| 5,791,838 A | 8/1998 | Hamilton |
| 5,816,753 A | 10/1998 | Hall |
| 5,820,318 A | 10/1998 | Danielsson et al. |
| 5,924,825 A | 7/1999 | Schwab et al. |
| 5,957,633 A | 9/1999 | Hall |
| 6,200,077 B1 | 3/2001 | Svenningsson |
| 6,616,387 B2 | 9/2003 | Schneider et al. |
| 6,929,432 B2 | 8/2005 | Roman et al. |
| 6,948,891 B2 | 9/2005 | Roman |
| 6,984,094 B2 | 1/2006 | Nuzzi et al. |
| 7,108,460 B2 | 9/2006 | Chang |
| 7,226,250 B2 | 6/2007 | Gatton |
| 7,632,050 B2 | 12/2009 | Nuzzi et al. |
| 7,841,812 B2 | 11/2010 | Küchler |
| 7,980,794 B2 | 7/2011 | Kawade |
| 2004/0018064 A1 | 1/2004 | Liu |
| 2004/0177491 A1 | 9/2004 | Pinger |
| 2005/0286984 A1 | 12/2005 | Weise |
| 2007/0020057 A1 | 1/2007 | Chen |
| 2010/0209203 A1 | 8/2010 | Cao |

FOREIGN PATENT DOCUMENTS

| | | | |
|---|---|---|---|
| DE | 003803188 A1 | 8/1988 |
| DE | 003730589 A1 | 3/1989 |
| DE | 003733298 C2 | 4/1989 |
| DE | 003921734 A1 | 1/1991 |
| JP | 2004-261896 A2 | 9/2004 |
| SE | 461 077 | 1/1990 |
| SE | 523 755 | 5/2004 |
| WO | 2003-099494 A1 | 12/2003 |
| WO | 2003-099495 A1 | 12/2003 |

OTHER PUBLICATIONS

Supplementary European Search Report dated Aug. 5, 2011—European Application No. EP 07 86 1120—Sandvik Intellectual Property AB.

ROTATABLE MULTI-OPERATION TOOL FOR CHIP REMOVING MACHINING, AND A BASIC BODY THEREFOR

This application is a Continuation Application of U.S. patent application Ser. No. 11/987,857 filed on Dec. 5, 2007, which claims priority under 35 U.S.C. §119 to Swedish Patent Application No. 0700112-6 filed on Jan. 17, 2007, both of which are hereby incorporated by reference in their entirety.

FIELD OF THE INVENTION

The present invention relates generally to a rotatable multi-operation tool for chip removing machining, among other things hole making, of the type that includes, on one hand, a plurality of replaceable cutting inserts of different types, and on the other hand a basic body that is rotatable around a center axis and includes a rear end and a front end from which there is extending rearward an envelope surface in which at least one chip space, delimited by two opposite side surfaces, is countersunk. The chip space opens not only in the envelope surface but also in the front end. A first cutting insert is mounted in an insert seat that is formed in one side surface of the chip space as well as situated in the immediate vicinity of the front end and included in a cavity that opens in the front end for the cutting insert to partly protrude axially forward from the front end. The invention also relates to a basic body for multi-operation tools.

BACKGROUND OF THE INVENTION

Within the field of cutting or chip removing machining of, above all, workpieces of metal, miscellaneous working operations occur that are based on a workpiece and a tool being set in motion in relation to each other. Although the relative motions at times may be linear or rectilinear, many operations are carried out by a combination of linear and rotary motions. Previously, two main types of motion combinations could be distinguished, viz. on one hand, rotation of a workpiece and machining of the same using a non-rotary, linearly movable tool (i.e., turning), and on the other hand rotation of a tool for the machining of a fixed workpiece (i.e., drilling and milling). Recently, numerically controlled machines have been developed, in the form of so-called MultiTask machines or TurnMill centers, which dramatically increased the possibilities of combining different relative motions when the tool is to machine the workpiece. Thus, now it is, for instance, possible to clamp the workpiece in a holder, which may alternately either be fixed in a given location, or be brought to rotate, possibly during simultaneous linear motion of the holder, at the same time as a holder for the tool may not only be rotated and/or linearly fed, but also be moved planetary (transverse fed). The planetary motion can take place irrespective of whether the tool rotates in relation to the movable holder or is locked in relation to the same (i.e., without rotating around its own axis).

The combination possibilities offered in modern machines have resulted in a fairly intense development of so-called multi-operation tools, which in one and the same set-up can machine a workpiece in a plurality of different ways, e.g., by turning, milling, drilling, etc. In such a way, the number of tool exchanges, when individual tools are returned to a magazine and a new tool is picked out from the same to replace the preceding one, can be brought down to a minimum while increasing the efficient working hours of the machine. Examples of such multi-operation tools are disclosed in, for example, German patent document no. DE 3733298 A1, U.S. Patent Application Publication No. 2004/0177491 A1, and Swedish patent document SE 523755.

A commonly occurring task within the metal-working industry is to provide a hole having at least one female thread. Such holes may be deep or shallow, and either be open in both ends or open in one end and closed in the other (so-called blind holes). Furthermore, the thread may be formed either along the entire length of the hole wall or only along a part of the same. In the latter case, the thread is usually located closest to the entering mouth of the hole.

Also for the specific task of recessing a hole and providing the same with a thread, multi-operation tools of the drill type have been proposed. Thus, U.S. Pat. No. 4,943,191 discloses a drilling tool that includes two front cutting edges formed adjacent to chip flutes for the purpose of making holes, as well as two sets of thread-cutting teeth formed adjacent to the side limiting edges of the chip flutes. However, a disadvantage of this tool is that the tool has to be discarded, or possibly be reground, as soon as either the front, hole-making cutting edges or the thread-cutting teeth behind have been worn out or otherwise become unusable, because the cutting edges as well as the teeth are integrated in a common, solid drill body. Another disadvantage is that the tool only can generate threads having a predetermined profile shape and a predetermined pitch. Thus, in order to be able to provide threads having a varying profile shape and a varying pitch, a great number of different tools have to be provided. In addition, the thread is compulsorily formed along the entire length of the recessed hole.

Furthermore, by U.S. Pat. No. 5,733,078 a drilling tool is known, which in contrast to what has been described above, makes use of replaceable cutting inserts in a long-term operable basic body. However, also in this case, the hole-making cutting edges of the tool and the thread-cutting teeth thereof are active simultaneously, because they are included in one and the same cutting insert. A consequence of this is that the front tooth of each set of teeth partially participates directly in the hole-making task, without being able to work in an already generated hole wall. This mode of operation runs the risk of giving poor dimensional accuracy in the generated thread. Another disadvantage is that the thread always becomes as long as the proper hole. In other words, the hole can never, even partially, be formed with a smooth inside.

A chip-removing tool, which includes a plurality of cutting inserts and insert seats placed one after the other in a common, flute-like chip space, is a long-edge milling cutter. However, in this case, the cutting inserts and the appurtenant insert seats are of the same type so far that all cutting inserts of the row of cutting inserts are milling inserts, which cannot machine a workpiece in another way than by milling.

The present invention aims at obviating the above-mentioned disadvantages of previously known multi-operation tools and at providing an improved tool particularly suitable for purposes of making holes and forming threads. Therefore, an object of the invention is to provide a multi-operation tool by which a hole can be recessed and immediately thereafter be provided with one or more threads.

Another object of the invention is to provide a tool that, in direct connection with the hole making, allows the formation of one or more single grooves having an arbitrary cross-section shape in the hole wall, e.g., for clamp rings, O-rings or the like. Furthermore, the tool should be able to allow the formation of holes that includes one or more threads of varying length, as well as one or several smooth, threadless sections.

Yet another object of the invention is to provide a tool by which holes can be recessed having most varying diameters, and simultaneously allow forming of one or more threads of varying profile as well as varying pitch. In a particular respect, the invention aims at increasing the flexibility of the tool so far that the same should be convertible in a simple way for other tasks than thread forming, e.g., pure drilling or hole making. Although the main object of the invention is to provide a tool for hole making and the formation of internal threads, the tool should, however, also be possible to be used for external machining, e.g., turning of male threads.

Still another object of the invention is to enable a simple and cost-effective manufacture of the tool, among other things by allowing the use of standardized components, e.g., in the form of existing drill or milling cutter-body workpieces, as well as commercially available cutting inserts that do not require modifications.

SUMMARY OF THE INVENTION

In an embodiment, the invention provides a rotatable multi-operation tool for chip removing machining, including a plurality of replaceable cutting inserts of different types, and a basic body that is rotatable around a center axis and includes a rear end and a front end from which there is extending rearward an envelope surface in which at least one chip space, delimited by two opposite side surfaces, is countersunk, which opens in the envelope surface and in the front end. A first cutting insert is mounted in a first insert seat that is formed in one side surface of the chip space and situated in the immediate vicinity of the front end and included in a cavity that opens in the front end for the cutting insert to partly protrude axially forward from the front end. A second cutting insert, of a type other than the first cutting insert, is mounted in a second insert seat, which is formed in the same side surface as the first insert seat and situated axially behind the first insert seat. The second insert seat is included in a cavity that opens in a part of the envelope surface.

In another embodiment, the invention provides a basic body of a rotatable multi-operation tool for chip removing machining, including a rear end, a front end from which an envelope surface extends rearward, and two different types of insert seats, a first one of which is formed in one of two opposite side surfaces that delimit a chip space, which opens in the front end and in the envelope surface, and is included in a first cavity that is situated in the immediate vicinity of the front end and opens in the front end, the basic body being rotatable around a center axis. The second insert seat is included in a second cavity that is formed in the same side surface as the first cavity and situated axially behind the first cavity.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
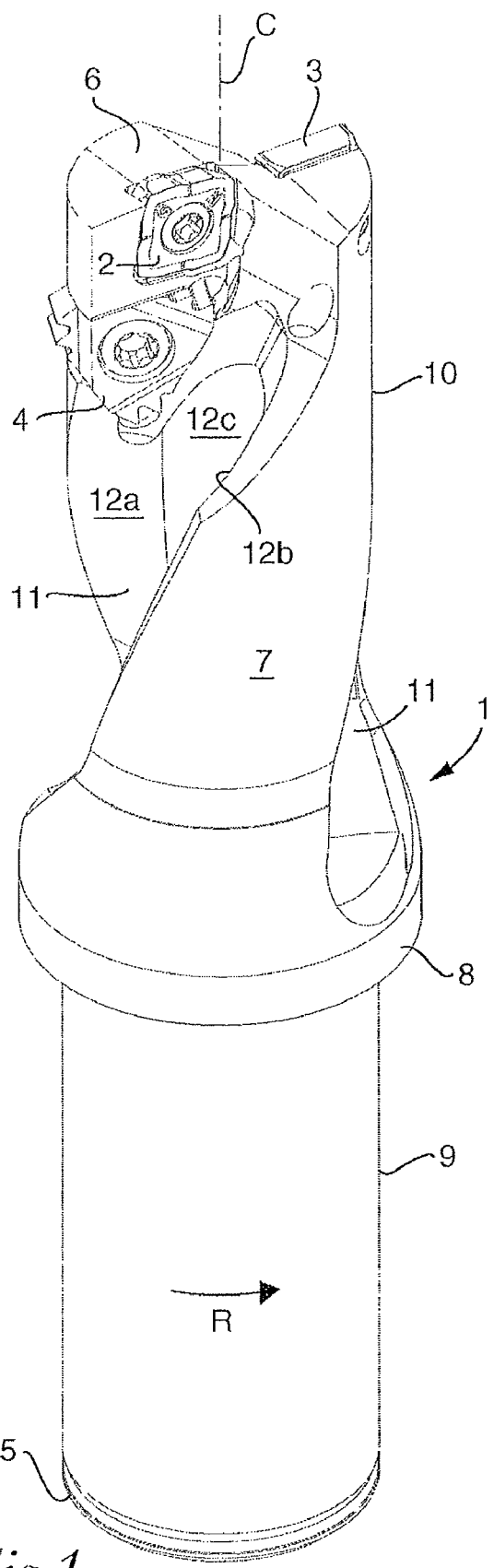
FIG. 1 is a perspective view of a multi-operation tool in accordance with an embodiment of the invention, the basic body of which is in the form of a drill body.
Figure 2:
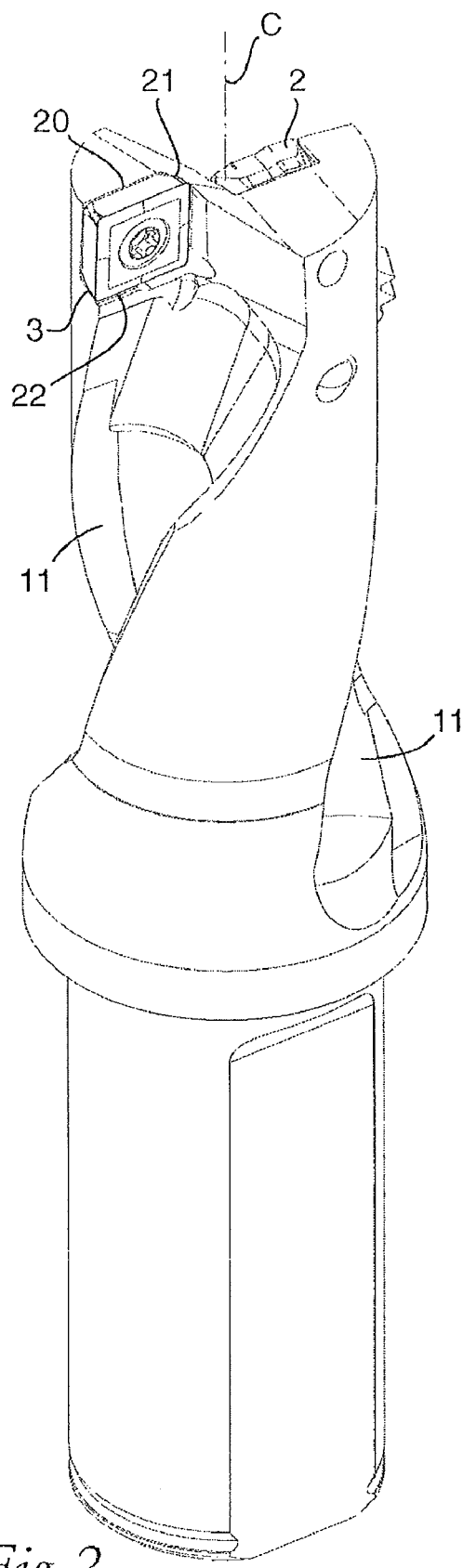
FIG. 2 is a perspective view showing the tool rotated 180° in relation to the location according to FIG. 1.

The tool shown in FIGS. 1-6 includes a basic body 1 as well as a plurality of replaceable cutting inserts 2, 3, 4. The basic body 1 is rotatable in the direction of rotation R around a center axis C and includes a rear end 5 as well as a front end 6, which is formed with a number of part surfaces of limited size. In the backward direction from the front end, an envelope surface 7 extends that in this case is rotationally symmetrical, more precisely cylindrical, and that ends in a collar 8, which separates the envelope surface 7 from a rear fixing part 9 that is fixable in a machine (not shown). In the front part 10 of the drill body delimited by the envelope surface 7, two chip spaces 11 are formed. In the embodiment shown, the basic body 1 has the shape of a drill body, and therefore the chip spaces 11 are flutes having a considerable length. Each flute is helicoidal and has a cross-sectionally concave shape. More precisely, the individual flute is delimited by two side surfaces 12a, 12b, which individually are concave and converge in a common, likewise concave bottom 12c.

Two of the cutting inserts, viz. the cutting inserts 2, 3, are mounted in the front end of the drill body 1, and protrude a distance axially from surrounding part surfaces. The cutting insert 2 is a center insert, which is mounted in a first insert seat included in a centrally situated pocket or cavity 13. More precisely, the insert seat is in this case formed of a bottom surface 14 and two side support surfaces 15. The cutting insert 2 is fixed by a screw 16 the male thread of which is tightened in a female thread in a hole 17 that opens in the bottom surface 14. The pocket 13 is spaced-apart from the envelope surface 7 via a border having a plane surface 18 formed in the extension of the side surface 12a of the chip flute 11. Due to the central placement thereof, the center insert 2 will machine only a central part of the hole recessed by the tool.

The cutting insert 3 is a peripheral cutting insert, which is mounted in a pocket or cavity 19, which is delimited by a plane bottom surface 20 and two side support surfaces 21, 22. The surfaces 20, 21, 22 together form an insert seat against which the peripheral cutting insert 3 can be urged with the underside and two side surfaces thereof. The bottom surface 20 extends up to the envelope surface 7 of the basic body, and therefore an active cutting edge, more precisely the cutting edge situated at the front and radially outer corner of the cutting insert, can be located somewhat outside the envelope surface 7. In this connection, refer to FIG. 4, in which the diameter of the front drilling body member 10 is designated D1, and the diameter of the imaginary circle S1, which is touched by the active corner edge of the cutting insert 3 when the tool rotates around its own center axis C, is designated D2.

In the same way as the center insert 2, the peripheral cutting insert 3 is fixed by a screw 16, the male thread of which can be tightened in a female thread in a hole (not visible) that mouths in the bottom surface 20.

Figure 3:
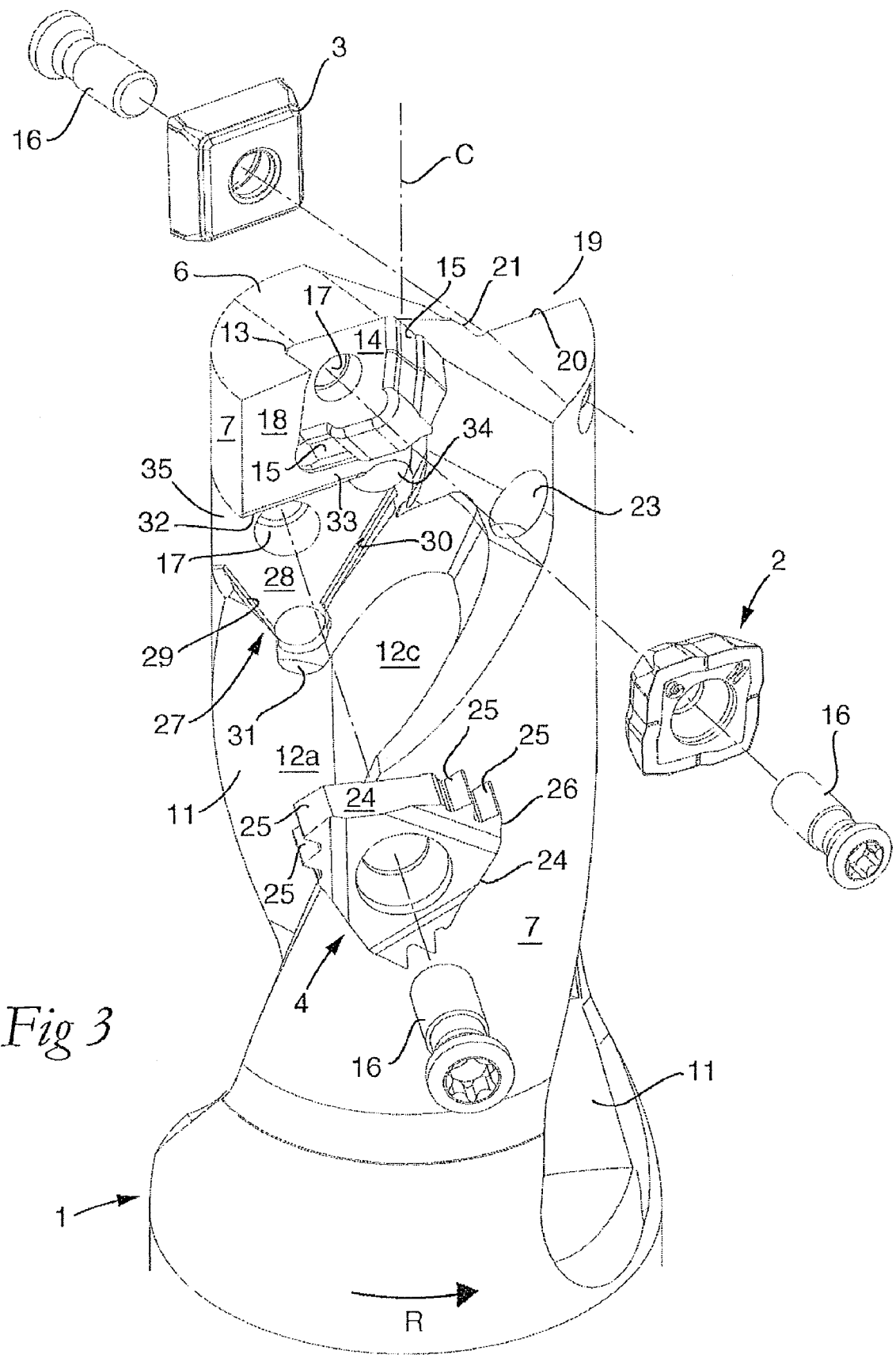
FIG. 3 is an enlarged, partial perspective exploded view of the same tool showing three cutting inserts included in the tool spaced-apart from the basic body.
Figure 6:
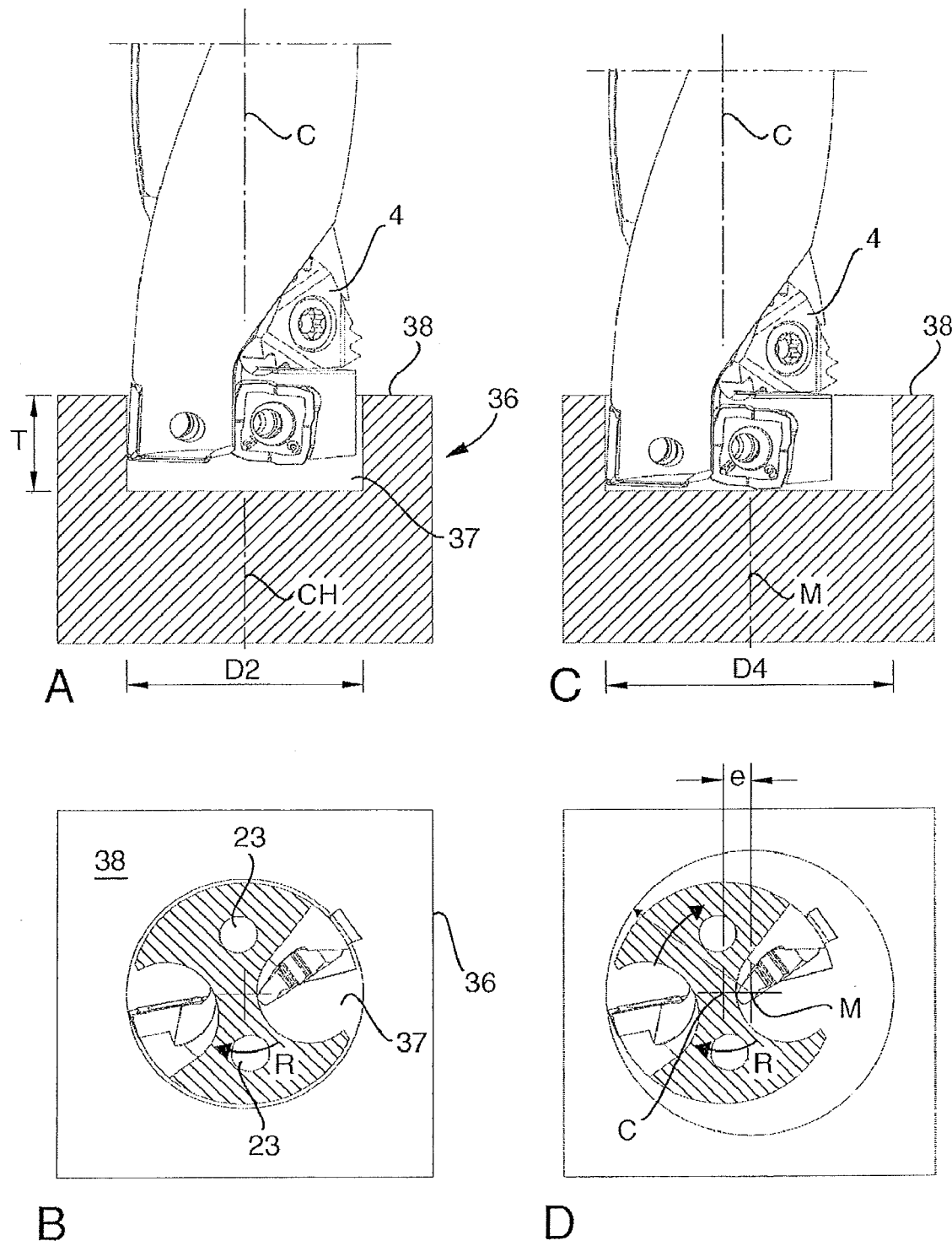
FIG. 6 is a series A-H illustrating four different steps in the machining of a workpiece by means of the tool.
Figure 6:
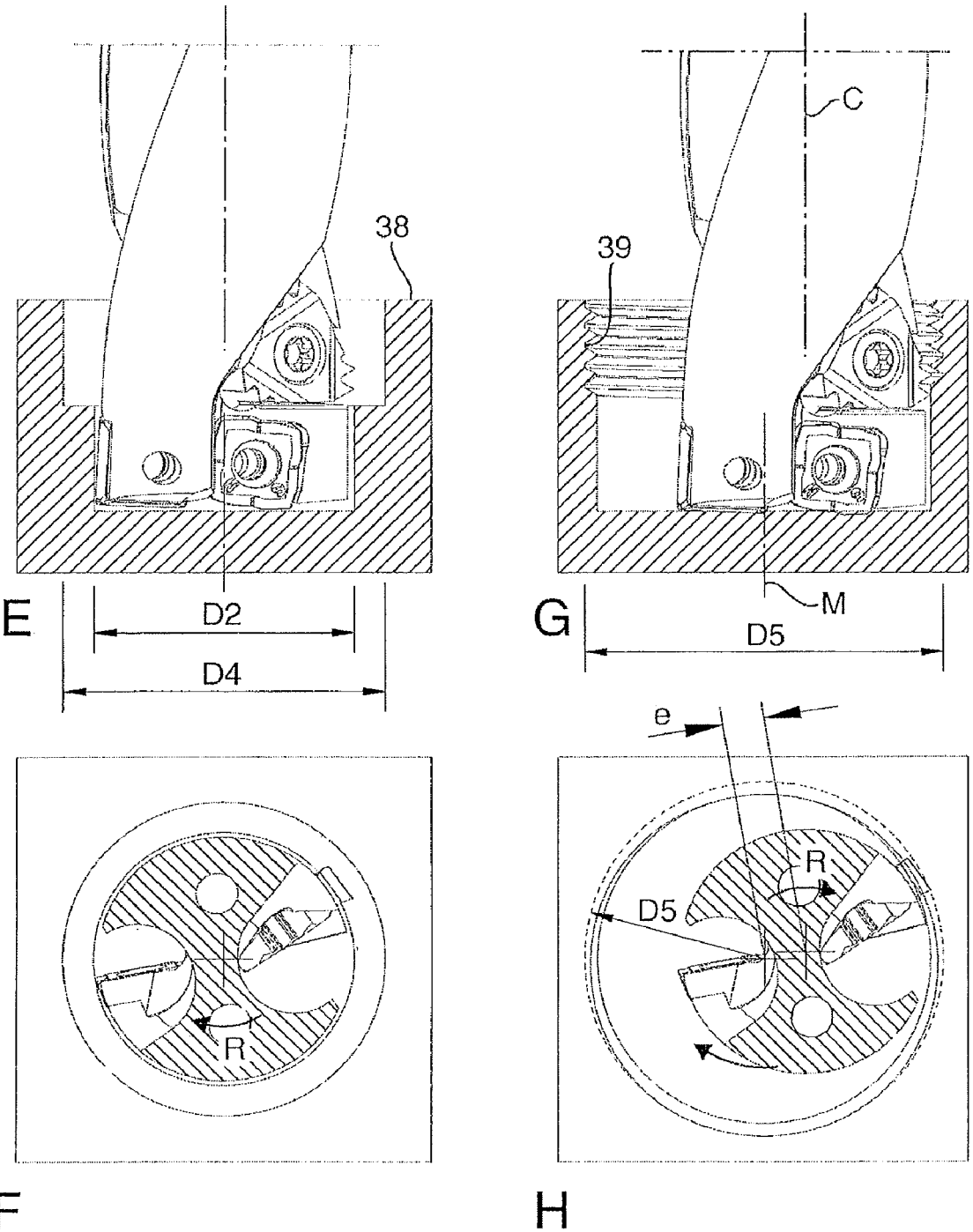
Figure 7:
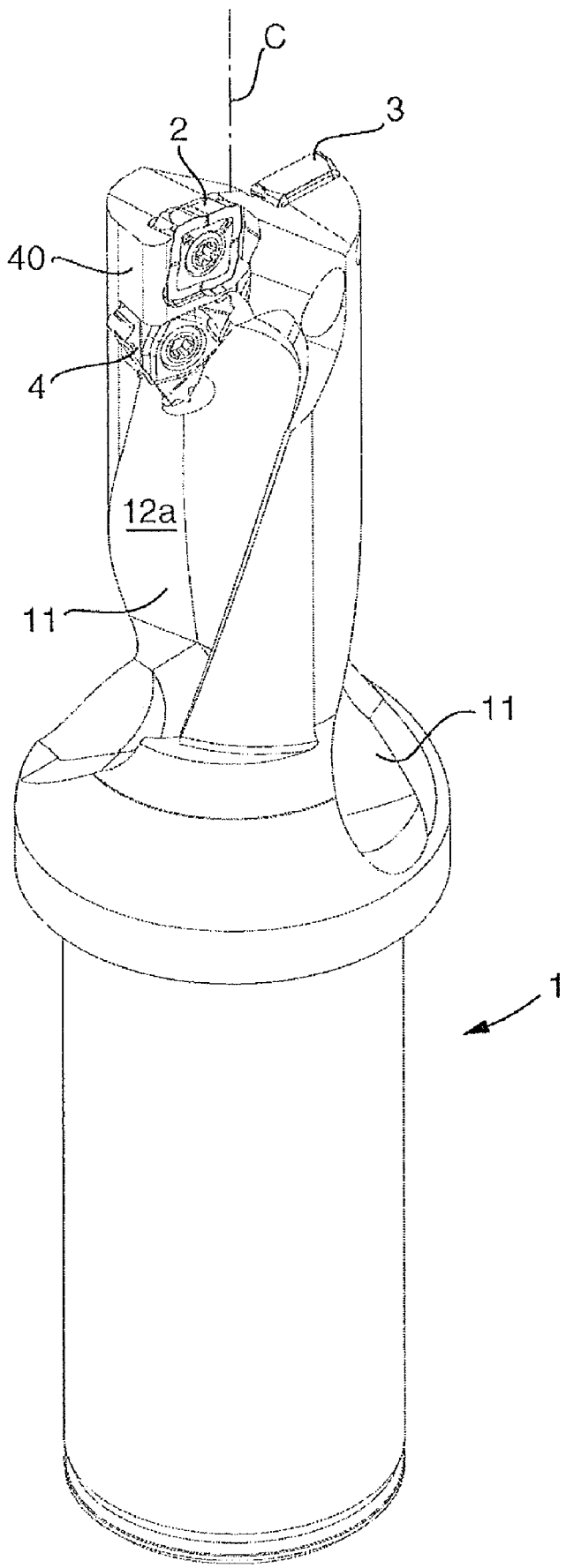
FIG. 7 is a perspective view of an alternative embodiment of the tool according to the invention.
Figure 8:
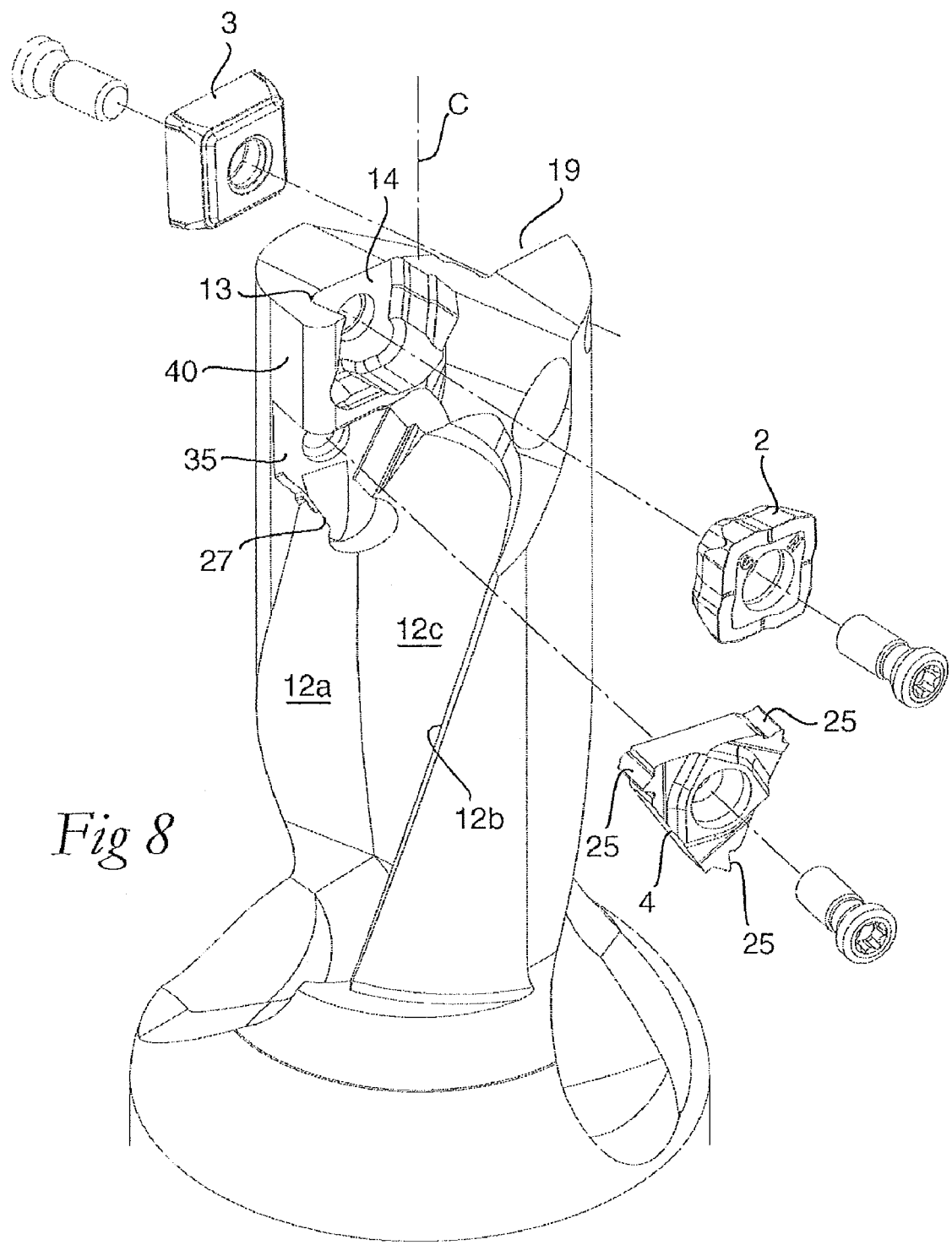
FIG. 8 is an enlarged perspective exploded view showing the cutting inserts of the tool in FIG. 7 spaced-apart from the basic body thereof.

In FIG. 6, it is seen that two cooling-liquid channels 23 are formed inside the basic body and extend from the rear end thereof toward the front. As is seen in FIG. 3, one of said cooling-liquid channels 23 mouths in the chip flute in which the center insert 2 is mounted, more precisely at a point situated in front of the cutting insert as viewed in the direction of rotation. The other cooling-liquid channel mouths under the peripheral cutting insert 3.

As far as the shown tool has been described hitherto, the same is in all essentials disclosed in International Patent Application Publication Nos. WO 03/099494 and WO 03/099495, as well as commercially available under the trademark CoroDrill 880®.

According to the invention, behind at least one of the two front cutting inserts 2, 3, a cutting insert 4 of another type than the front cutting inserts is arranged. In the example, the two front cutting inserts 2, 3 are in the form of drill cutting inserts, while the third cutting insert 4 is a turning insert, more precisely a thread-cutting insert. In the preferred embodiment, the cutting insert 4 is indexable and includes three suitably plane and homologous side surfaces 24, which converge in pairs at an angle of 60° toward corners in which teeth 25 are formed having cutting edges 26 for forming threads. In practice, the cutting insert may advantageously be a commercially available standard cutting insert for thread turning.

For the mounting of the cutting insert 4, behind the insert seat for the center insert 2, a third insert seat is formed, which is countersunk in a third pocket or cavity 27 and formed of a plane bottom surface 28 as well as two side surfaces 29, 30, which diverge at an angle of 60° from a clearance space 31 in which an inactive corner of the cutting insert can be housed. Like the other cutting inserts, the cutting insert 4 is fixed by a screw 16, which via a through hole in the cutting insert can be tightened in a female thread in a hole 17 that mouths in the bottom surface 28. The screw 16 is in a known way elastically deformable in order to, upon final tightening, apply a lateral tightening force to the cutting insert, which presses two side surfaces 24 of the of the cutting insert against the two side support surfaces 29, 30 in the insert seat.

In addition, the pocket 27 is delimited by a third side surface 32, however, against which the cutting insert does not bear. The side surface 32 is partly formed on a partition wall 33, which separates the two pockets 13 and 27. The two side surfaces 30, 32 converge toward a second clearance space 34, which has the purpose of housing the other inactive corner of the cutting insert. The pocket 27 opens in the envelope surface 7 via a generally rectangular opening 35, which is delimited by radially outer borderlines of the surfaces 28, 29 and 32. The opening 35 from all sides is surrounded by the cylindrical envelope surface 7. This means that the borderlines to the surfaces 29 and 32 are arched.

Figure 4:
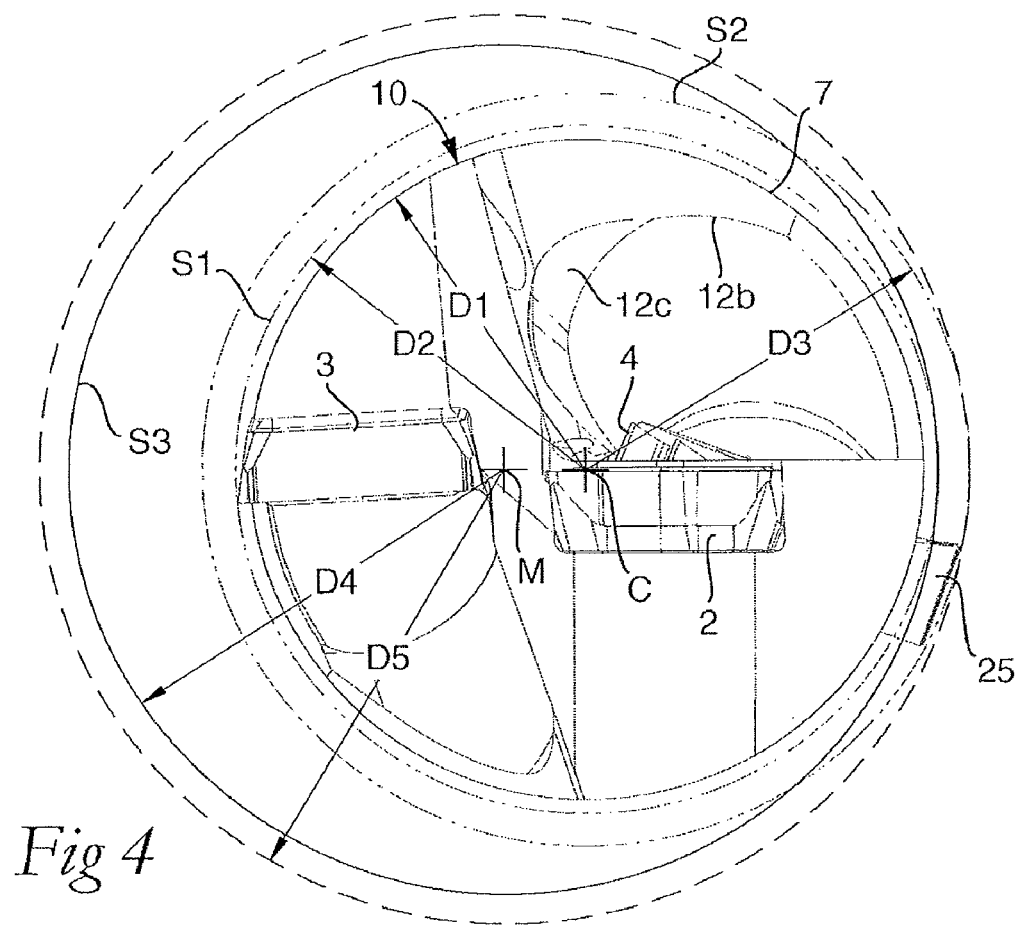
FIG. 4 is an end view from the front of the tool.
Figure 5:
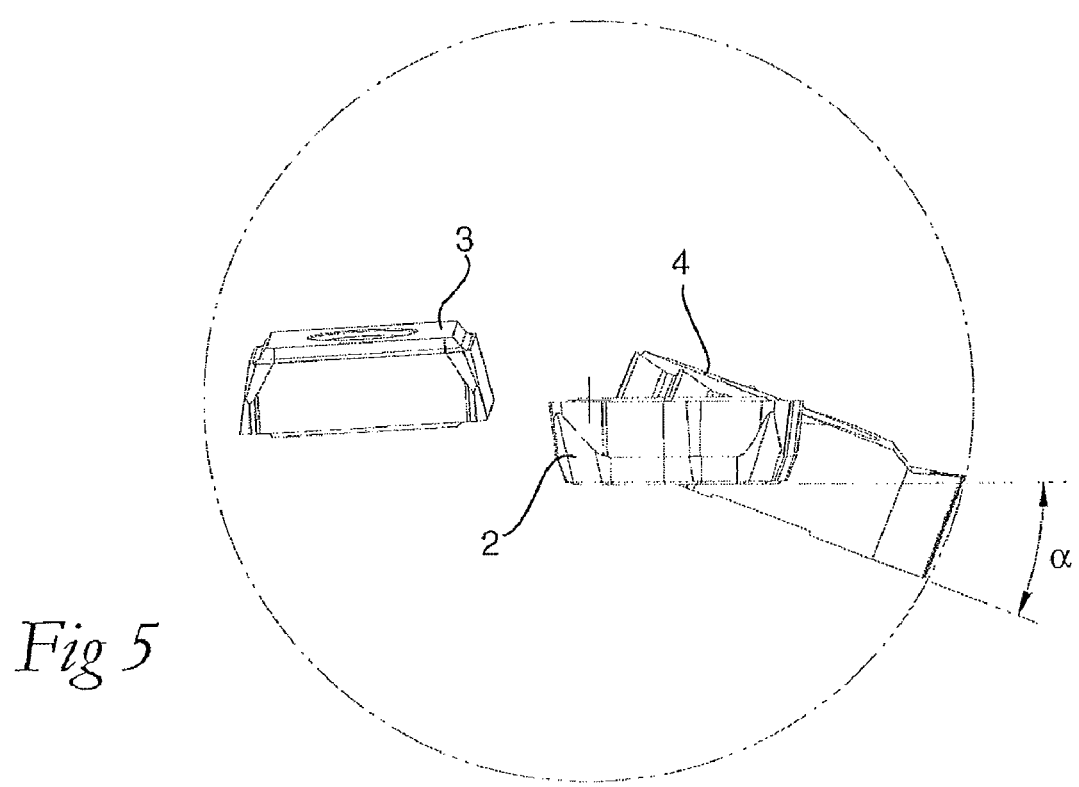
FIG. 5 is a view showing the space positions of the three cutting inserts in the tool.

Reference is now made to FIGS. 4 and 5, which partly schematically illustrate the space-geometrical locations of the cutting inserts of the tool. As has been previously mentioned, the front part 10 of the drill body 1 has a diameter designated D1. When the tool rotates around its own center axis C the active cutting edge of the peripheral cutting insert 3 describes a circle S1, the diameter of which is designated D2. Upon such rotation, the radially outermost, active tooth 25 of the thread-cutting insert 4 describes a circle S2, the diameter of which is D3.

As has been previously mentioned, the tool and the workpiece can be moved planetary or be cross-fed in relation to each other in modern machines. In such a way, the tool can provide a cylindrical hole, which is represented by the circle S3 in FIG. 4, and the diameter D4 of which is larger than the diameter D2. The center M for the circle S3 is eccentric in relation to the center axis C of the tool. As is seen by the fact that D3 is larger than both D1 and D2, in this case the outermost cutting tooth 25 projects radially not only in relation to the envelope surface 7 of the basic body, but also in relation to the active cutting edge of the peripheral cutting insert 3.

In FIG. 5, it is seen that the cutting inserts 2 and 4 mounted in the tool, i.e., the center insert and the thread-cutting insert, form a certain radial angle α with each other. Although this radial angle α may vary, the same should be within the range of 10-25°. In the example, α is approximately 20°. Also the axial angles (lacks designations) of the cutting inserts 2, 4 may differ. For instance, the axial angle of the center insert 2 may be zero or positive, while the axial angle of the thread-cutting insert 4 behind is negative, e.g., within the range of 2-5°.

Reference is now made to FIG. 6, which schematically illustrates a series of consecutive working operations that can be carried out by the described tool. In the pair of Figures A-B, a simple drilling operation is illustrated, which can be carried out either by rotating the tool while a workpiece 36 is clamped, or by rotating the workpiece and the tool being clamped, so far that it does not rotate around its own center axis C. Requisite longitudinal feed may be effected either by moving the tool linearly along its own axis, or by moving the workpiece linearly. It is even possible to simultaneously rotate as well as longitudinally feed the tool and the workpiece. In this operation, the center axis CH of the recessed hole 37 coincides with the center axis C of the tool.

The bore depth T is limited in the shown operation by the axial location of the protruding thread-cutting insert 4 along the drill body, i.e., the front end of the tool is not fed further into the workpiece 36 than that the teeth of the protruding thread-cutting insert clear the entering surface 38. In this first drilling step, a hole is created having the diameter D2 (see also FIG. 4).

In the next step, according to the pair of Figures C-D, the diameter of the hole is widened to D4. This is carried out by a planetary combination of motions, which by those skilled in the art is denominated helix interpolation, and which is realized by the tool—under simultaneous rotation around its own center axis C—is set in motion in such a way that the same circles around the center axis M of the hole to be made, more precisely in a circular path of motion. Simultaneously, the tool is longitudinally fed in relation to the workpiece, however not deeper than that the thread-cutting insert 4 still clears the entering surface 38. The diameter D4 of the widened hole is determined by the eccentric measure "e" according to the formula $D4=D2+(2\times e)$.

In one or more subsequent steps, which is illustrated in the pair of Figures E-F, another or more central holes having the diameter D2 may be drilled while extending the hole to the desired depth, and then each central hole is widened to the diameter D4 in the way shown in the pair of Figures C-D.

In a concluding step according to the pair of Figures G-H, a thread 39 is formed in the inside of the recessed hole. This is carried out by milling by the thread-cutting insert 4. For this purpose, the tool is brought to rotate around its own center axis C at the same time as the same is helix interpolated, more precisely by the center axis C of the drill being brought to circle around the center or center axis M of the hole during simultaneous longitudinal feed, the value of which determines the pitch of the thread to be made. The completed thread obtains the outer diameter D5 (see also FIG. 4). In this operation step, the center insert 2 is inactive and the thread-cutting insert 4 active, while the peripheral cutting insert 3 may be either inactive or active so far that the same may mill off additional material from the hole wall. If the recessed hole is a blind hole, such as shown in FIG. 6, the thread 39 can be formed along only a limited part of the length of the hole, more precisely adjacent to the entering surface 38. However, if the hole is through, the thread can be formed along the entire length of the hole.

In the operation sequence shown in FIGS. 6 A-H, the proper hole is recessed by drilling in a plurality of steps, something that is preferred as a consequence of drilling—in comparison with milling—being a quick operation. However, this does not prevent that the tool is utilized to make the hole as well as the thread in a single, continuous, pure milling operation.

Figure 9:
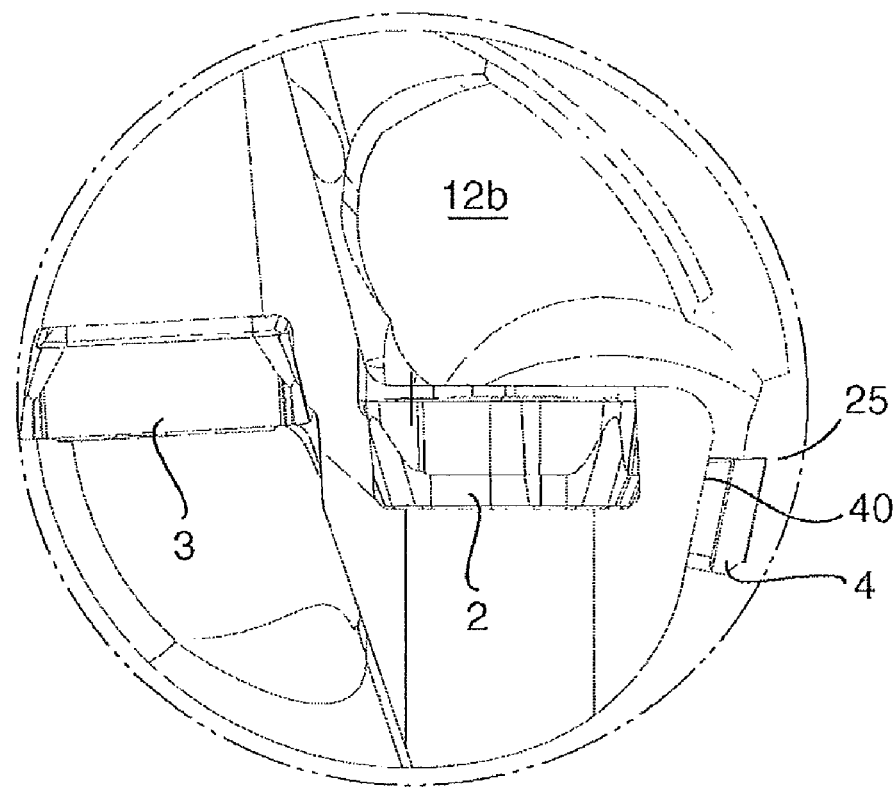
FIG. 9 is an end view corresponding to FIG. 4 of the tool according to FIGS. 7 and 8.
Figure 10:
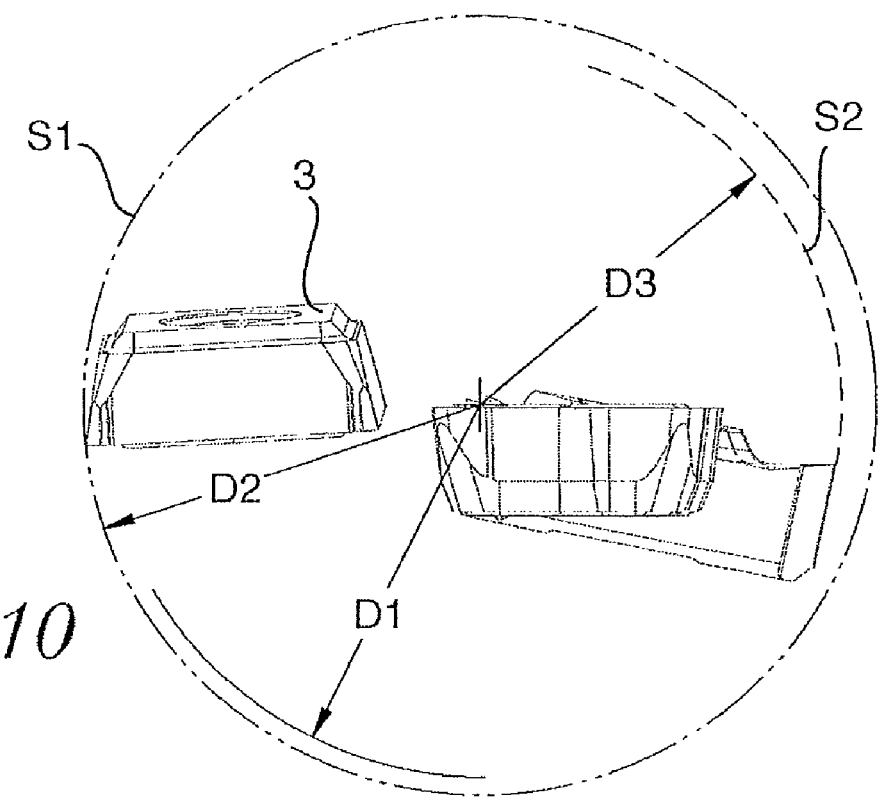
FIG. 10 is a view showing the mutual locations of the cutting inserts in the tool in FIG. 7.
Figure 11:
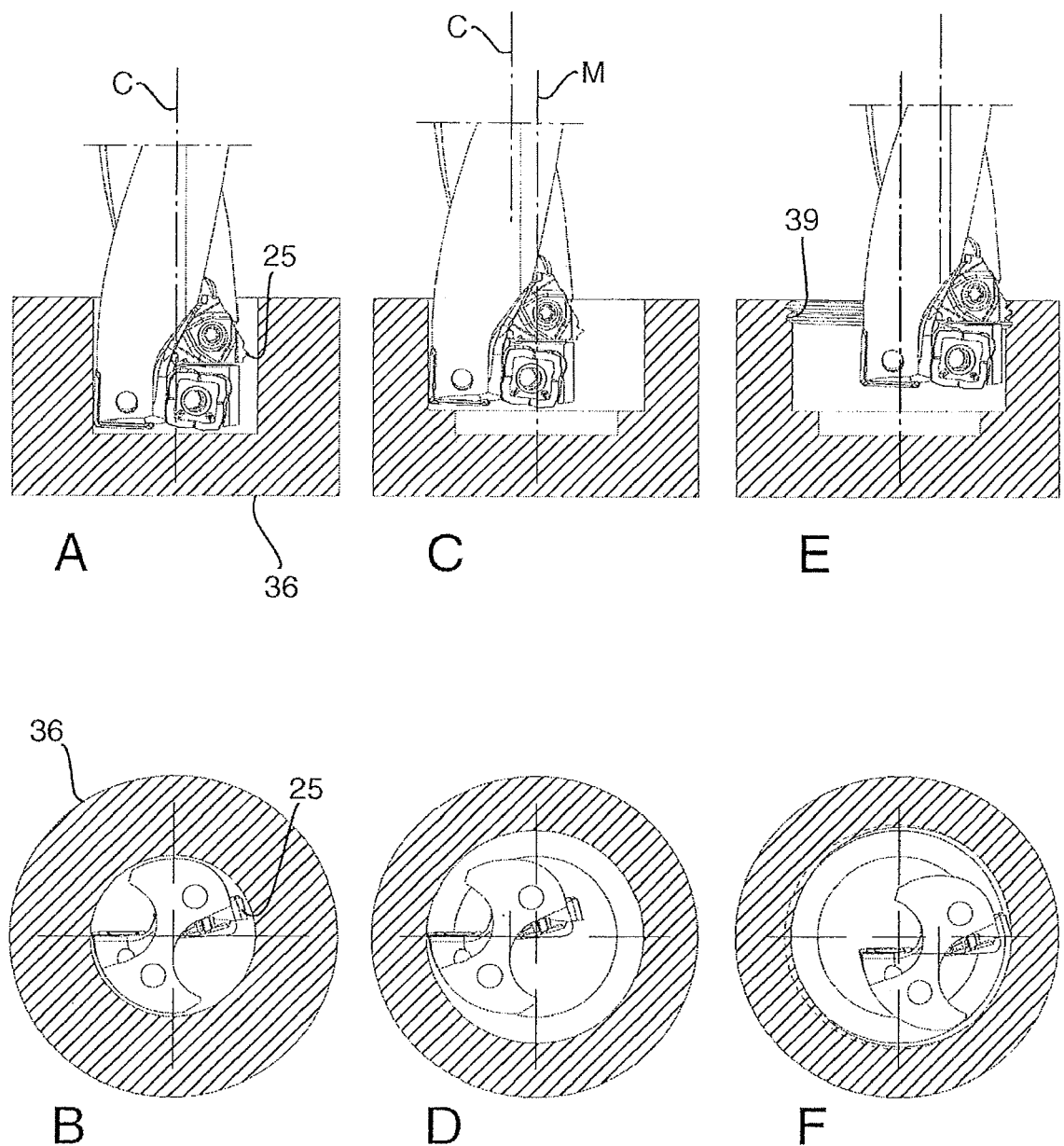
FIG. 11 is a series A-F showing different steps in the machining of a workpiece by the tool according to FIGS. 7-10.

In FIGS. 7-11, an alternative embodiment of a multi-operation tool is shown, which differs from the one described previously primarily in the shape and placement in the tool of the thread-cutting insert 4. Thus, in this case the cavity 27 for the thread-cutting insert 4 is formed adjacent to a so-called relief in the form of a non-cylindrical part surface 40 that is situated inside the imaginary cylinder defined by the envelope surface 7. In such a way, the chip-removing cutting edge of the thread-cutting insert can be located closer to the center axis of the basic body than in the former case. Thus, as is seen in FIGS. 9-10, the imaginary circle S2, described by the thread-cutting edge under the own rotation of the tool, has a diameter D3 that is smaller than the hole diameter D1, i.e., the diameter of the circle 51 described by the active cutting edge of the peripheral cutting insert 3 under rotation. In the example shown, D3 is even smaller than the diameter D2 of the proper drill body.

In FIGS. 7-11, it is seen that the thread-cutting insert 4 in this case only includes one cutting tooth 25 at each corner. However, also this cutting insert may have a plurality of teeth at each corner.

As a consequence of the active cutting tooth of the thread-cutting insert, in this case, being located radially inside the active cutting edge of the peripheral cutting insert 3, the tool can be used for drilling of holes, the length of which is not limited by the axial location of the thread-cutting insert 4 along the drill body. Thus, in the pair of Figures A-B in FIG. 11, it is shown how a hole can be drilled without the active tooth 25 of the thread-cutting insert 4 contacting the hole wall. In the pair of Figures C-D, it is shown how the recessed hole can be widened by helix interpolation, i.e., planetary motion under simultaneous rotation and axial feed of the tool and the workpiece in relation to each other. When this hole has been given the desired length and diameter, forming of threads follows according to the pair of Figures E-F. Most suitably, this is carried out by the workpiece being set in rotation at the same time as the tool is axially fed after first having been set out radially into an eccentric location in relation to the center of the hole, in which location the active cutting tooth forms the radially outermost element of the tool. In other words, during this operation, the tool works as a boring bar for internal turning.

Figure 12:
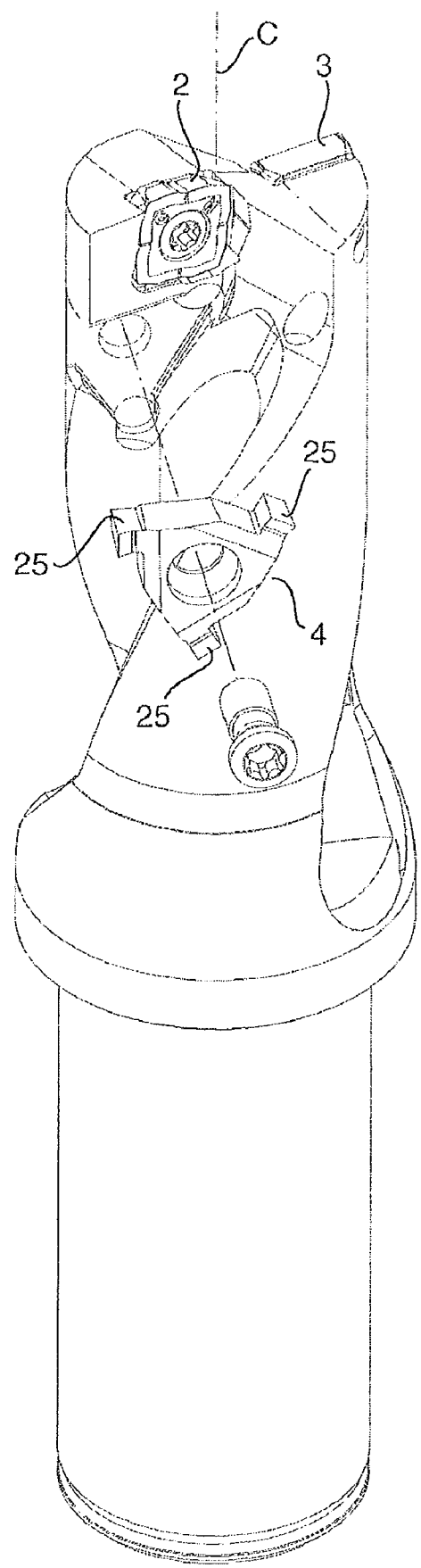
FIG. 12 is a partly exploded perspective view showing an additional alternative embodiment of the tool according to the invention.

Reference is now made to FIG. 12, which illustrates a tool the turning insert 4 of which is suitable for forming internal grooves in the recessed holes. Thus, in this case the cutting insert 4 includes cross-sectionally U-shaped teeth 25. By cross-feeding the tool without feeding the same longitudinally, the active cutting tooth can turn a groove irrespective of whether the workpiece is brought to rotate in relation to the tool or vice versa.

Figure 13:
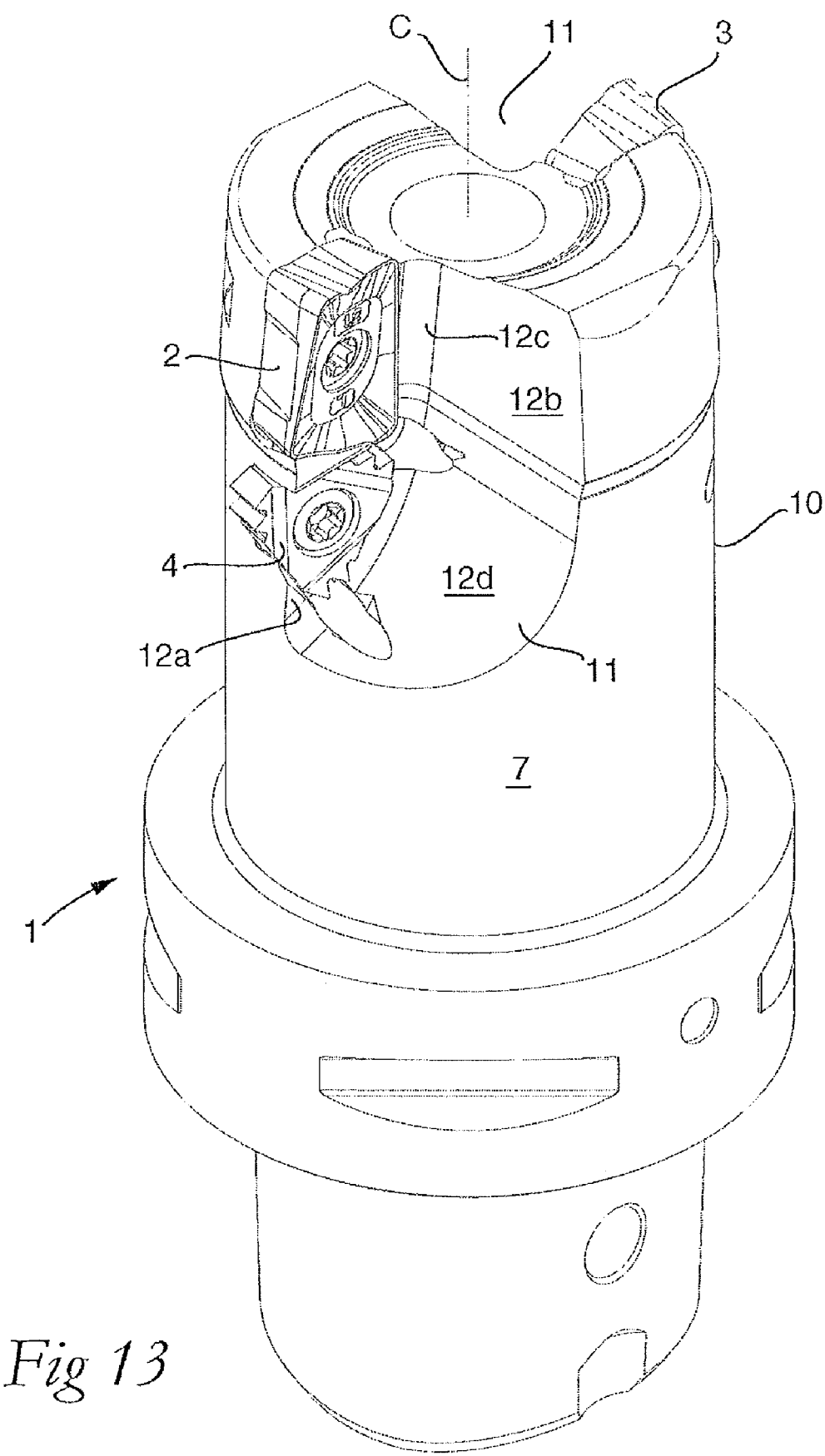
FIG. 13 is a perspective view of a fourth embodiment of the tool, the basic body of the tool being in the form of a milling-cutter body.

In FIG. 13, an additional alternative embodiment of the invention is shown. In this case, the basic body 1 has the shape of a milling-cutter body having a front head 10 in which two chip spaces 11 are recessed that are considerably shorter than the previously described flutes in a drill body.

The two chip spaces house front cutting inserts 2, 3, which advantageously are identical and consist of milling inserts, e.g., of standard type. Behind at least one of the milling inserts, a cutting insert 4 of another type than the milling inserts is arranged in the way previously described. Also in this case, the cutting insert 4 behind is in the form of a thread-cutting insert. In accordance with the invention, the same is mounted in the same side surface 12a as the front cutting insert 2. The opposite side surface of the chip space 12 is delimited by a plane side surface 12b as well as a concavely arched part surface 12d. Between the side surface 12a and the two part surfaces 12b, 12d, there is a radius transition 12c. In FIG. 13, it is seen that the axial length of the chip space 12 is only just slightly greater than the total space occupied by the two cutting inserts 2, 4.

Although the basic body of the tool in this case is a milling-cutter body having a generally larger diameter than the previously described drill bodies, the tool according to FIG. 13 can carry out the same working operations as the tool shown in FIGS. 1-6.

A fundamental advantage of the tool according to the invention is that the same immediately after the recessing of a hole can be utilized for internal machining of the recessed hole, e.g., by thread forming, grooving or the like. In other words, no tool exchange is required between the hole making and the internal machining. Furthermore, the tool can, in one and the same set-up, form holes that include one or more threads of varying length as well as one or several smooth, threadless sections. Another advantage is that one and the same tool can be utilized for the recessing of holes having most varying diameters at the same time as the same can be quickly machined internally in miscellaneous ways. The tool offers a particular degree of freedom so far that the same does not necessarily need to be utilized for internal machining of holes. By either removing the rear cutting insert or the auxiliary insert in the individual chip space, or by simply not setting out the same radially (according to FIGS. 7-11), the tool can accordingly be utilized for pure hole making. In addition, it is possible to use the tool for external machining, e.g., grooving or turning of threads.

While the invention has been disclosed with reference to certain preferred embodiments, numerous modifications, alterations, and changes to the described embodiments are possible without departing from the sphere and scope of the invention, as defined in the appended claims and their equivalents thereof. For example, it is possible to form the basic body of the tool with more than two tangentially spaced-apart chip spaces or flutes. Among the same, one or more, e.g., all, may include one or more cutting inserts mounted behind the front insert of another type than the front insert. Instead of triangular turning inserts, also other auxiliary inserts may be used, e.g., round cutting inserts. Furthermore, the tool may include only a single front insert. Accordingly, it is intended that the invention not be limited to the described embodiments, but that it have the full scope defined by the language of the following claims.

What is claimed:

1. A rotatable multi-operation tool for chip removing machining, comprising:
   a plurality of replaceable cutting inserts of different types; and
   a basic body that is rotatable around a center axis and includes a rear end and a front end from which there is extending rearward an envelope surface in which at least one chip space, delimited by two opposite side surfaces, is countersunk, which opens in the envelope surface and in the front end,
   a first cutting insert being mounted in a first insert seat that is formed in one side surface of the chip space and situated in the immediate vicinity of the front end and included in a cavity that opens in the front end for the cutting insert to partly protrude axially forward from the front end, the cavity that opens in the front end being spaced-apart from the envelope surface,
   a second cutting insert, of a type other than the first cutting insert, being mounted in a second insert seat, which is formed in the same side surface as the first insert seat and situated axially behind the first insert seat, the second insert seat being included in a cavity that opens in a part of the envelope surface, wherein
   the envelope surface is at least partially cylindrical such that its largest radius defines a radius of an imaginary circle, and the cavity including the second insert seat is axially adjacent to a relief surface that is radially situated inside the imaginary circle, the relief surface being a part of the envelope surface.

2. The tool according to claim 1, wherein the basic body includes two tangentially spaced-apart chip spaces, each one of which includes a front insert seat and an appurtenant cutting insert, and at least one of which includes a rear insert seat and an appurtenant cutting insert.

3. The tool according to claim 2, wherein the two front cutting inserts are hole-making inserts, one of which is a center insert and the other of which is a peripheral cutting insert that determines the bore diameter of the tool.

4. The tool according to claim 3, wherein the rear cutting insert in the chip flute is behind the center insert.

5. The tool according to claim 4, wherein a radially outer cutting edge of the rear cutting insert in the chip flute is tangent to another imaginary circle, the diameter of which is larger than the bore diameter of the tool.

6. The tool according to claim 1, wherein the basic body is in the form of a drill body, the chip space of which is an elongate flute that extends a distance rearward from the second cutting insert.

7. The tool according to claim 6, wherein the chip flute is helicoidal and delimited by two concave side surfaces that converge into a common, concave bottom.

8. The tool according to claim 1, wherein a radially outer cutting edge of the rear cutting insert in the chip flute is tangent to another imaginary circle, the diameter of which is smaller than the bore diameter, and protrudes a distance from the relief surface that is included in the envelope surface and situated next to the flute side surface in which the cutting insert that is forward of the rear cutting insert is placed.

9. The tool according to claim 1, wherein the second cutting insert is countersunk in relation to the first cutting insert such that an upperside of the rear cutting insert is situated under an imaginary plane in the extension of an upperside of the front cutting insert.

10. The tool according to claim 1, wherein each cutting insert is in its entirety embedded in the appurtenant cavity.

11. The tool according to claim 1, wherein the first and second cutting inserts are inclined in relation to each other at an acute radial angle ($\alpha$) within the range of 10-25°.

12. The tool according to claim 1, wherein the first cutting insert has an axial angle that is neutral or positive, while the second cutting insert has a negative axial angle.

13. The tool according to claim 1, wherein the second cutting insert in the chip space has a triangular basic shape, and includes three corners, one of which protrudes through the opening of the appurtenant cavity toward the envelope surface.

14. The tool according to claim 13, wherein the second cutting insert is indexable and includes three homologous side surfaces, which converge in pairs at an angle of 60° toward corners in which cutting edges are included.

15. The tool according to claim 1, wherein the two cavities in which the insert seats are included are spaced-apart from each other via a partition wall.

16. The tool according to claim 1, wherein the relief surface is non-cylindrical.

17. The tool according to claim 16, wherein the relief surface is a planar surface.

18. The tool according to claim 1, wherein the cavity that opens in the front end is spaced-apart from the envelope surface via a planar surface.

* * * * *